(12) United States Patent
Burke et al.

(10) Patent No.: US 6,865,730 B1
(45) Date of Patent: Mar. 8, 2005

(54) INTERPROCEDURAL ANALYSIS AND OPTIMIZATION OF AN OBJECT ORIENTED PROGRAM IN THE PRESENCE OF DYNAMIC CLASS LOADING

(75) Inventors: Michael G. Burke, Yonkers, NY (US); Jong-Deok Choi, Mt. Kisco, NY (US); Vugranam C. Sreedhar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/579,357

(22) Filed: May 26, 2000

Related U.S. Application Data

(60) Provisional application No. 60/187,721, filed on Mar. 8, 2000.

(51) Int. Cl.[7] ............................................. G08F 09/44
(52) U.S. Cl. ........................ 717/116; 717/151; 717/152; 717/153; 717/154; 717/155; 717/156; 717/157; 709/315
(58) Field of Search ................... 717/116, 10, 151–158, 717/166, 165, 130, 148, 146, 140, 115; 709/315

(56) References Cited

U.S. PATENT DOCUMENTS

| | | | | |
|---|---|---|---|---|
| 5,535,391 A | * | 7/1996 | Hejlsberg et al. | 717/140 |
| 5,966,537 A | * | 10/1999 | Ravichandran | 717/158 |
| 5,970,249 A | * | 10/1999 | Holzle et al. | 717/153 |
| 5,987,256 A | * | 11/1999 | Wu et al. | 717/146 |
| 6,182,277 B1 | * | 1/2001 | DeGroot et al. | 717/115 |
| 6,202,205 B1 | * | 3/2001 | Saboff et al. | 717/151 |
| 6,289,506 B1 | * | 9/2001 | Kwong et al. | 717/148 |
| 6,463,581 B1 | * | 10/2002 | Bacon et al. | 717/154 |
| 6,546,551 B1 | * | 4/2003 | Sweeney et al. | 717/154 |
| 6,557,168 B1 | * | 4/2003 | Czajkowski | 717/151 |
| 6,567,974 B1 | * | 5/2003 | Czajkowski | 717/151 |
| 6,622,300 B1 | * | 9/2003 | Krishnaswamy et al. | 717/130 |
| 6,631,518 B1 | * | 10/2003 | Bortnikov et al. | 717/158 |
| 6,704,927 B1 | * | 3/2004 | Bak et al. | 717/151 |
| 2001/0047513 A1 | * | 11/2001 | Tock | 717/10 |
| 2002/0104076 A1 | * | 8/2002 | Shaylor | 717/148 |
| 2002/0144011 A1 | * | 10/2002 | Hinsley | 709/315 |
| 2003/0191867 A1 | * | 10/2003 | Czajkowski | 709/315 |
| 2004/0015914 A1 | * | 1/2004 | Renouf | 717/148 |

OTHER PUBLICATIONS

Tyng et al., Non–intrusive object introspection in C++: architecture and application, Apr. 19 –25, 1998, IEEE, pp.: 312–321.*

Jensen, et al., Security and dynamic class laoding in Java: a formalisation, May 1998, IEEE, pp.: 4 –15.*

Hamidzadeh, et al., Dynamic task scheduling using online optimization, Nov. 2000, IEEE,vol.: 11, Issue: 11, pp.: 1151 –1163.*

(List continued on next page.)

*Primary Examiner*—Anil Khatri
*Assistant Examiner*—Satish S. Rampuria
(74) *Attorney, Agent, or Firm*—F. Chau & Associates, LLC

(57) ABSTRACT

A method is provided for analyzing an object oriented program that supports dynamic class loading. A set A of classes in the program is identified, wherein each class within set A is capable of, during execution of the program, causing the loading of a class outside of set A. A first set of method calls belonging to the classes in set A are identified that, during execution of the program, are capable of calling only methods belonging to a class within set A. A second set of method calls belonging to the classes in set A are identified that, during execution of the program, are capable of calling methods belonging to a class outside set A. Data that identifies the first and the second set of method calls is stored for subsequent use.

29 Claims, 6 Drawing Sheets

OTHER PUBLICATIONS

Ronald, How to head off debug problems with Java, Mar. 1, 1999, Electronic Engineering Times, pp. 76, 96.*

Clifford, Advance JAVA 2, 1999, Sun Microsystems, 2nd edition, p. 249–252.*

Fitzgerald et al., Marmot: An Optimizing Compiler for JAVA, Jun. 1999, Microsoft Research, p. 1–29.*

Liang et al., Dynamic Class Loading in the JAVA Virtual Machine, Oct. 1998, ACM, p. 1–8.*

Grove et al., Call Graph Construction in Object–Oriented Languages, 1997, OOPSLA, p. 1–17.*

DeFouw, Fast Interprocedural Class Analysis, Jan. 1998, Department of Computer Science and Engineering University of Washington, p. 1–32.*

Bjarne Steensgaard, "Points–to Analysis in Almost Linear Time", $23^{rd}$ Annual ACM SIGACT–SIGPLAN Symposium on the Principles of Programming Languages, pp. 32–41, Jan. 1996.

Bracha et al., "Dynamic Class Loading in the JAVA Virtual Machine", ACM Conference on Object–Oriented Programming Systems, Languages, and Applications, pp. 1–9, Oct. 1998.

Bacon et al., "Fast Static Analysis of C++ Virtual Function Calls", ACM Conference on Object–Oriented Programming Systems, Languages, and Applications, pp. 324–341, Oct. 1996.

Chambers et al., "Debugging Optimized Code with Dynamic Deoptimization", SIGPLAN 92 Conference on Programming Language Design and Implementation, SIGPLAN Notices 27(6), pp. 1–12, Jun. 1992.

Holzle et al., "A Third Generation Self Implementation: Reconciling Responsiveness with Perforance", ACM Conference on Object–Oriented Programming Systems, Languages, and Applications, pp. 229–243, Oct. 1994.

Saraswat, "Java is not type–face", AT&T Research, http://loria.fr/~lliquori/JAVA/bug.html. Aug. 1997.

Burke et al., "Interprocedural Optimization: Eliminating Unnecessary Recompilation", ACM Transactions on Programming Languages and Systems, 15(3): 367–399, Jul. 1993.

Alpern et al., "Dynamic Linking in a Shared–Memory Multiprocessor", International Conference on Parallel Architectures and Compilation Techniques, pp. 1 –7, Oct. 1999.

Agesen et al., "Inlining of Virtual Methods", $13^{th}$ European Conference on Object–Oriented Programming, pp. 357–378, Jun. 1999.

Holzle et al/. "Optimizing Dynamically–Dispatched Calls with Run–Time Type Feedback", SIGPLAN 94 Conference on Programming Language Design and Implementation, SIGPLAN Notices, 29(6), pp. 326–336, Jun. 1994.

Laffra et al., "Practical Experience with an Application Extractor for JAVA", ACM Conference on Object–Oriented Programming Systems, Languages, and Applications, pp. 292–305, Nov. 1999.

Fitzgerald et al., "Marmot: An optimizing Complier for JAVA", Technical Report MSR–TR–99–33, Microsoft Research, pp. 1–29, Jun. 1999.

Ven Seshadri, "IBM High Performance Complier for JAVA", IBM Corp., 1997, described at http://simont01.torolab.ibm.com/hpj/hpjj.html , available for download at http://www.alphaWorks.ibm.com/formula.

Emami et al., "Context–Sensitive Interprocedural Points–To Analysis in the Presence of Function Pointers", SIGPLAN 94 Conference on Programming Language Design and Implementation, SIGPLAN Notices, 29(6), pp. 242–256, Jun. 1994.

Lam et al., "Efficient Context–Sensitive Pointer Analysis for C Programs", SIGPLAN 95 Conference on Programming Language Design and Implementation, SIGPLAN Notices, 30(6) pp. 1–12, Jun. 1995.

Landi et al., "A Safe Approximate Algorithm for Interprocedural Pointer Aliasing", SIGPLAN 92 Conference on Programming Language Design and Implementation, SIGPLAN Notices 27(6), pp. 235–248, Jun. 1992.

Burke et al., "Efficient Flow–Sensitive Interprocedural Computation of Pointer–Induced Aliases and Side Effects", $20^{th}$ Annual ACM SIGACT–SIGPLAN Symposium on the Principles of Programming Languages, pp. 232–245, Jan. 1993.

Chase et al., "Analysis of Pointers and Structures", SIGPLAN 90 Conference on Programming Language Design and Implementation, SIGPLAN Notices 25(6), pp. 296–310, Jun. 1990.

Landi et al. "Data Flow Analysis of Program Fragments", Proceedings of the $7^{th}$ Symposium on the Foundations of Software Engineering, pp. 1–18, Sep. 1999.

Chatterjee et al., "Relevant Context Inference", $26^{th}$ Annual ACM SIGACT–SIGPLAN Syposium on the Principles of Programming Languages, pp. 133–146, Jun. 1999.

Choi et al., "Escape Analysis for JAVA", ACM Conference on Object–Oriented Programming Systems, Languages, and Applications, pp. 1–19, Oct. 1999.

Choi et al., "Automatic Construction of Sparse Data Flow Evauation Graphics", $18^{th}$ Annual ACM Symposium on the Principles of Programming Languages, pp. 55–66, Jan. 1991.

Alpern et al., "Implementing Jalapeño in JAVA", ACM Conference on Object–Oriented Programming Systems, Languages, and Applications, pp. 1–11, Oct. 1999.

Chambers et al., "Selective Specialization for Object–Oriented Languages", SIGPLAN 95 Conference on Prorgamming Language Design and Implementation, SIGPLAN Notices, 30(6), pp. 93–102, Jun. 1995.

Consel et al., "A Generl Approach for Run–Time Specialization and its Application to C", 1996 ACM Symposium on Principles of Programming Languages, pp. 145–156, Jan. 1996.

Steve Meloan, "The JAVA HOTSPOT Performance Engine: An In–Dept Look", Technical Report, SUn Microsystems, Inc., pp. 1–15, Apr. 1999.

Ishizaki et al., "Design, Implementation, and Evauation of Optimizations in a Just–In–Time Compiler", ACM 1999 JAVA Grande Conference, pp. 199–228, Jun. 1999.

"BulletTrain™optimizing compiler and runtime for JVM bytecodes", http://www.naturalbridge.com/bullettrain.htm Baylor, et al., "Java server benchmarks", IBM Systems Journal, vol. 39, No. 1, 2000, pp. 57–81.

Sagiv, et al., "Solving Shape–Analysis Problems in Language with Destructive Updating", Conference Record of the 23 ACM Symposium on Principles of Programming Languages, pp. 1–50, A1–A9, Jan. 1998.

Cryton et al., "Efficiently Computing Static Single Assignment Form and the Control Dependence Graph", ACM Transactions on Programming Languages and Systems, vol. 13, No. 4, Oct., 1991, pps. 451–490.

Chambers et al., "Call Graph Construction on Object–Oriented Languages", ACM Confernece on Object–Oriented Programming Systems, Languages, and Applications, pp. 108–124, Oct. 1997.

Chambers, "The Design and Implementation of the SELF Compiler, an Optimizing Compiler for Object–Oriented Programming Languages", PhD Thesis, Standford University, Mar. 1992.

* cited by examiner

INTERPROCEDURAL ANALYSIS AND OPTIMIZATION OF AN OBJECT ORIENTED PROGRAM IN THE PRESENCE OF DYNAMIC CLASS LOADING

CROSS REFERENCE TO RELATED UNITED STATES APPLICATIONS

This application claims priority from "Framework for Interprocedural Analysis and Optimization in the Presence of Dynamic Class Loading", U.S. Provisional Application No. 60/187,721, of Burke, et al., filed Mar. 8, 2000.

TECHNICAL FIELD

The present invention relates generally to object oriented programming and, in particular, to interprocedural analysis and optimization of an object oriented program in the presence of dynamic class loading.

BACKGROUND DESCRIPTION

The just-in-time (JIT) compilation model for the JAVA programming language (henceforth referred to as "JAVA") is an impediment to generating code that is as efficient as code generated using static optimization. Sophisticated static compilers for C++ perform whole program analysis, optimization, and transformation, to generate efficient code. Whole program analysis is possible for the C++ language, since C++ does not allow new classes and/or methods to be loaded during program executions. In C++, when faced with calls to methods whose bodies are not known during compile time, such as Dynamic Link Libraries (DLLs), these static compilers usually make conservative assumptions about the methods.

In JAVA, new classes can be loaded "on-the-fly" during program execution, as noted by Bracha et al., in "Dynamic Class Loading in the JAVA Virtual Machine", ACM Conference on Object-Oriented Programming Systems, Languages, and Applications, October 1998. Attempting to apply the C++ whole program static analysis framework to JAVA can result in an incorrect program. For example, consider a virtual call p.foo( ). In C++, whole program analysis can be used to determine whether a virtual call has only one target, as described by Bacon et al., in "Fast Static Analysis of C++ Virtual Function Calls", ACM Conference on Object-Oriented Programming Systems, Languages, and Applications, pp. 324–41, October 1996. If so, the virtual call can be directly converted to a static call (and the call possibly inlined). Attempting to do such devirtualization in JAVA (without a runtime type check guarding the devirtualization) can result in an incorrect program because, during execution, a new class can be loaded and p.foo( ) can invoke a new foo( ) in the newly loaded class.

One solution for avoiding incorrect execution after a new class is loaded is to invalidate and recompile affected methods, as described by: Chambers et al., in "Debugging Optimized Code with Dynamic Deoptimization", SIGPLAN '92 Conference on Programming Language Design and Implementation, SIGPLAN Notices 27(6), June 1992; Holzle et al., in "A Third Generation Self Implementation: Reconciling Responsiveness with Performance", ACM Conference on Object-Oriented Programming Systems, Languages, and Applications, pp. 229–43, October 1994; Craig Chambers, "The Design and Implementation of the Self Compiler, an Optimizing Compiler for Object-Oriented Programming Languages", PhD thesis, Stanford University, March 1992; and Burke et al., in "Interprocedural Optimization: Eliminating Unnecessary Recompilation", ACM Transactions on Programming Languages and Systems, 15(3):367–399, July 1993.

However, runtime invalidation and recompilation mechanisms have several drawbacks, such as: (1) they can be expensive in both space and time; (2) the activation stack frame for active and invalidated methods may have to be rewritten; (3) they can restrict how much optimization one allowed to do so that invalidation can be correctly applied during runtime; and (4) a complex and an expensive synchronization mechanism may be needed to correctly invalidate methods in a multithreaded environment. The second disadvantage is further described by Chambers et al., in "Debugging Optimized Code with Dynamic Deoptimization", SIGPLAN '92 Conference on Programming Language Design and Implementation, SIGPLAN Notices 27(6), June 1992. The third disadvantage is further described in the immediately preceding article by Chambers et al., and also by Craig Chambers, in "The Design and Implementation of the Self Compiler, an Optimizing Compiler for Object-Oriented Programming Languages", PhD thesis, Stanford University, March 1992. The fourth disadvantage is further described by Alpern et al., in "Dynamic Linking on a Shared-Memory Multiprocessor", International Conference on Parallel Architectures and Compilation Techniques, October 1999.

Accordingly, there is a need for a method that optimizes an object oriented program in the presence of dynamic class and/or method loading.

SUMMARY OF THE INVENTION

The problem state above, as well as other related problems of the prior art, are solved by the present invention, which is directed to interprocedural analysis and optimization of an object oriented program in the presence of dynamic class loading.

According to a first aspect of the invention, there is provided a method for analyzing an object oriented program that supports dynamic class loading. A set A of classes in the program is identified, wherein each class within set A is capable of, during execution of the program, causing the loading of a class outside of set A. A first set of method calls belonging to the classes in set A are identified that, during execution of the program, are capable of calling only methods belonging to a class within set A. A second set of method calls belonging to the classes in set A are identified that, during execution of the program, are capable of calling methods belonging to a class outside set A. Data that identifies the first and the second set of method calls is stored for subsequent use.

According to a second aspect of the invention, the method further includes the step of reporting the stored data to a user.

According to a third aspect of the invention, the method further includes the step of optimizing the program, based upon the stored data.

According to a fourth aspect of the invention, the method further includes the steps of, for a given method call in the second set: adding an optimization to the program that is valid when the given method call calls, during execution of the program, only methods belonging to a class in the set A; and adding code to the program that triggers execution of the optimization when the given method call calls, during execution of the program, only methods belonging to a class in the set A.

According to a fifth aspect of the invention, the steps of identifying the first and the second set include the step of performing static analysis of the program.

According to a sixth aspect of the invention, the optimization corresponds to at least one of devirtualization and stack allocation.

According to a seventh aspect of the invention, there is provided a method for optimizing an object oriented program that supports dynamic class loading. A set A of classes in the program is identified, wherein each class within set A is capable of, during execution of the program, causing the loading of a class outside of set A. An optimization is added to the program that is valid when a given method call belonging to the classes in set A is capable of calling, during an execution of the program, only methods belonging to a class in set A.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Furthermore, for purposes of illustration, the present invention will be described herein in relation to JAVA, which is a well known object oriented programming language. However, it is to be understood that the present invention is applicable to other object oriented programming languages, as well as non object oriented programming languages. Given the teachings herein, one of ordinary skill in the related art will be able to contemplate these and similar implementations or configurations of the present invention.

Figure 1:
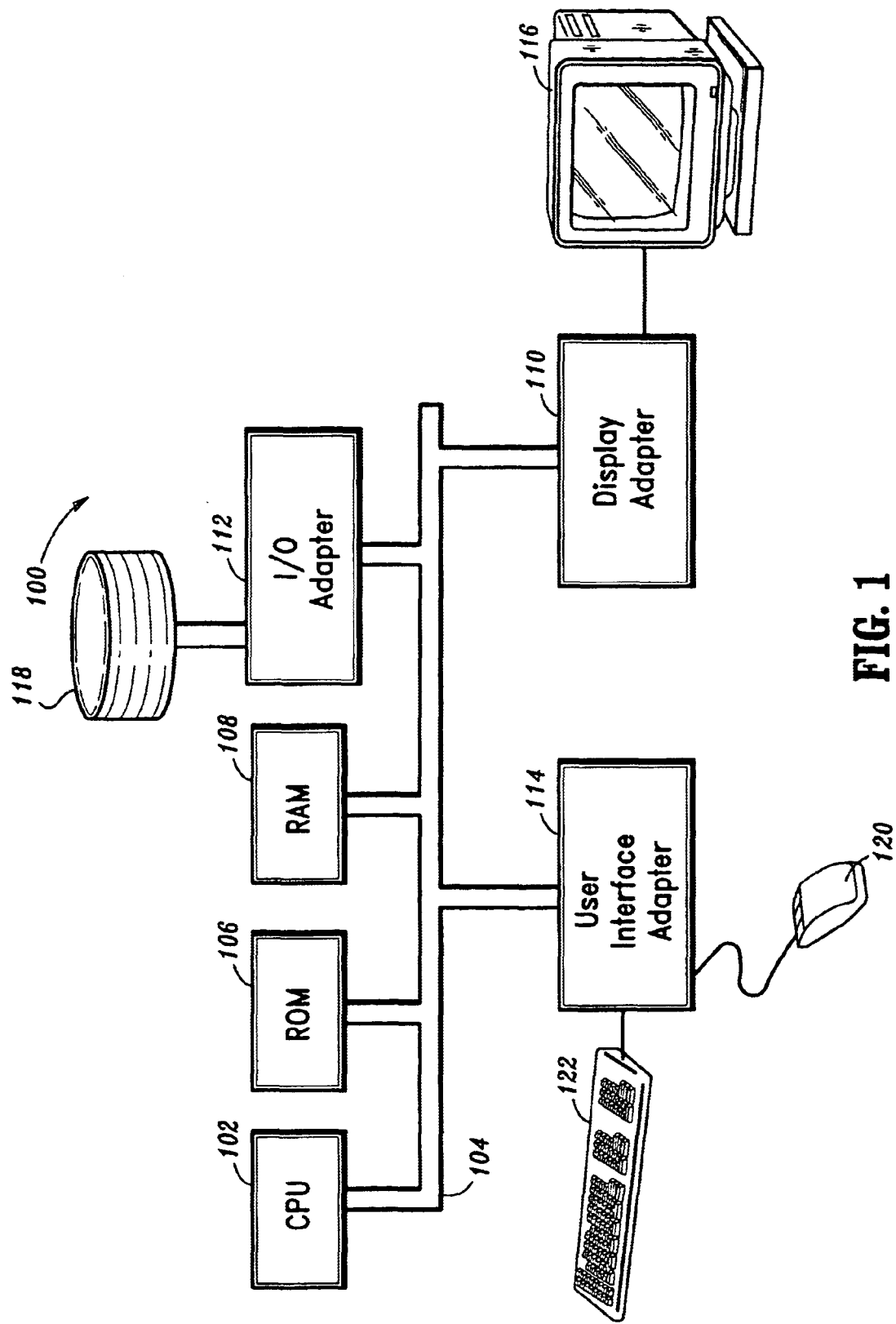
FIG. 1 is a block diagram of a computer processing system to which the present invention may be applied according to an illustrative embodiment thereof.

FIG. 1 is a block diagram of a computer processing system 100 to which the present invention may be applied according to an illustrative embodiment thereof. The computer processing system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100.

The present invention is directed to a new framework for interprocedural analysis and optimization of programs that support dynamic class (and/or method) loading (e.g., programs written in JAVA). The new framework is henceforth referred to as the "extant analysis framework".

Figure 2:
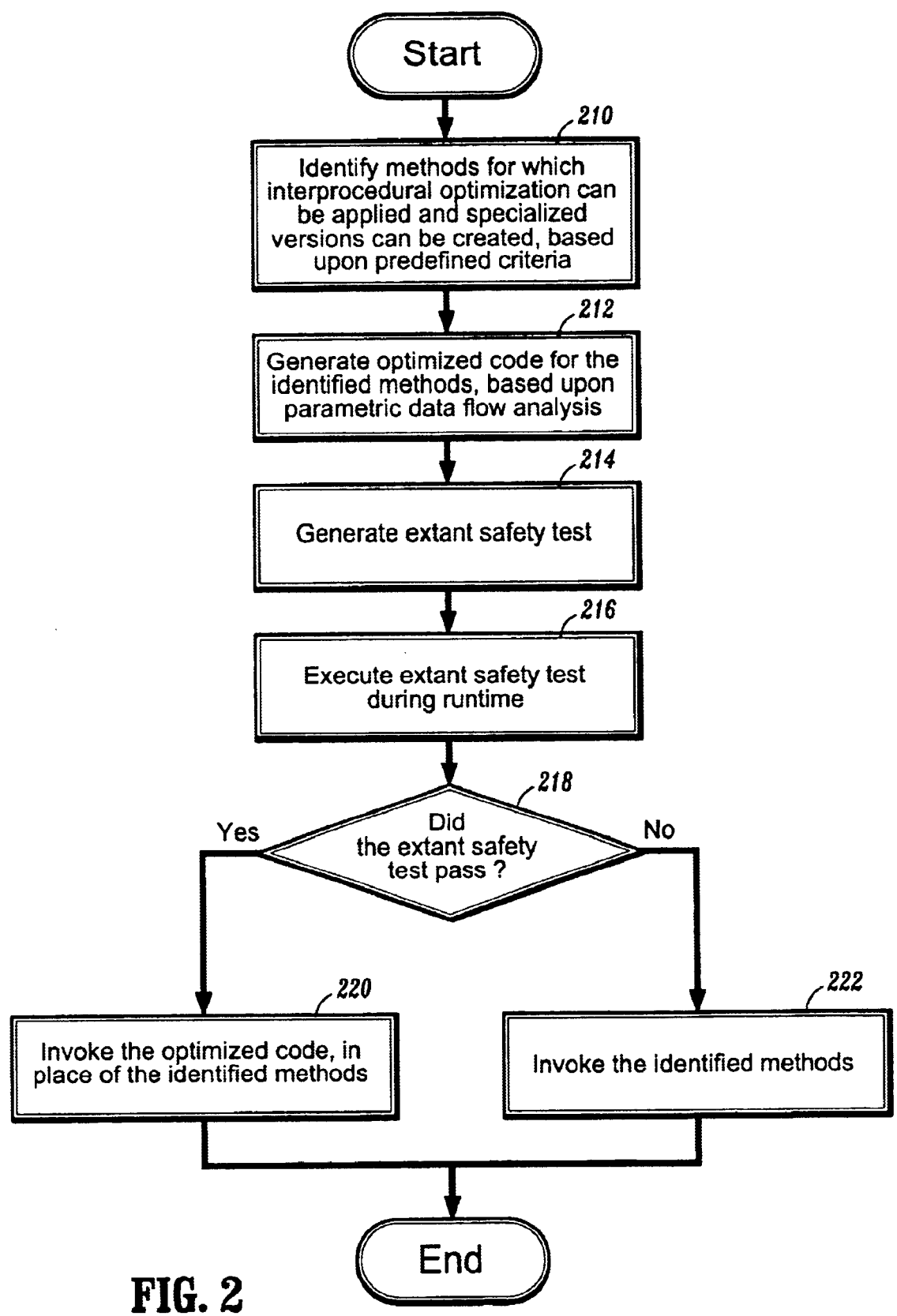
FIG. 2 is a flow diagram of a method for analyzing and optimizing an object oriented program that supports dynamic class loading, according to an illustrative embodiment of the invention.

A general description of the present invention will now be provided with respect to FIG. 2 to introduce the reader to the concepts of the invention. Subsequently, more detailed descriptions of various aspects of the invention will be provided.

FIG. 2 is a flow diagram of a method for analyzing and optimizing an object oriented program that supports dynamic class loading, according to an illustrative embodiment of the invention. The method of FIG. 2 is based upon the extant analysis framework of the invention.

During an off-line phase, methods of the program are identified for which interprocedural optimization can be applied and specialized versions can be created, based upon predefined criteria (step 210). The predefined criteria correspond to "extant analysis", which is described in detail hereinbelow. Optimized code is generated for the identified methods, based upon parametric data flow analysis (step 212). The optimized code represent specialized versions of the identified methods. Additional code, henceforth referred to as the "extant safety test", is generated (step 214). The extant safety test is used to determine whether or not to call the specialized or unspecialized method during execution of the program.

The extant safety test is executed during runtime of the program (step 216). It is then determined whether the extant safety test passed (step 218). If so, then the optimized code (i.e., the specialized versions of the methods) is invoked (step 220). Otherwise, the identified methods (i.e., the unspecialized versions of the methods) are invoked (step 222). Within the framework, once a specialized method is invoked, it will execute correctly and safely for that invocation even when new classes are loaded.

Figure 3:
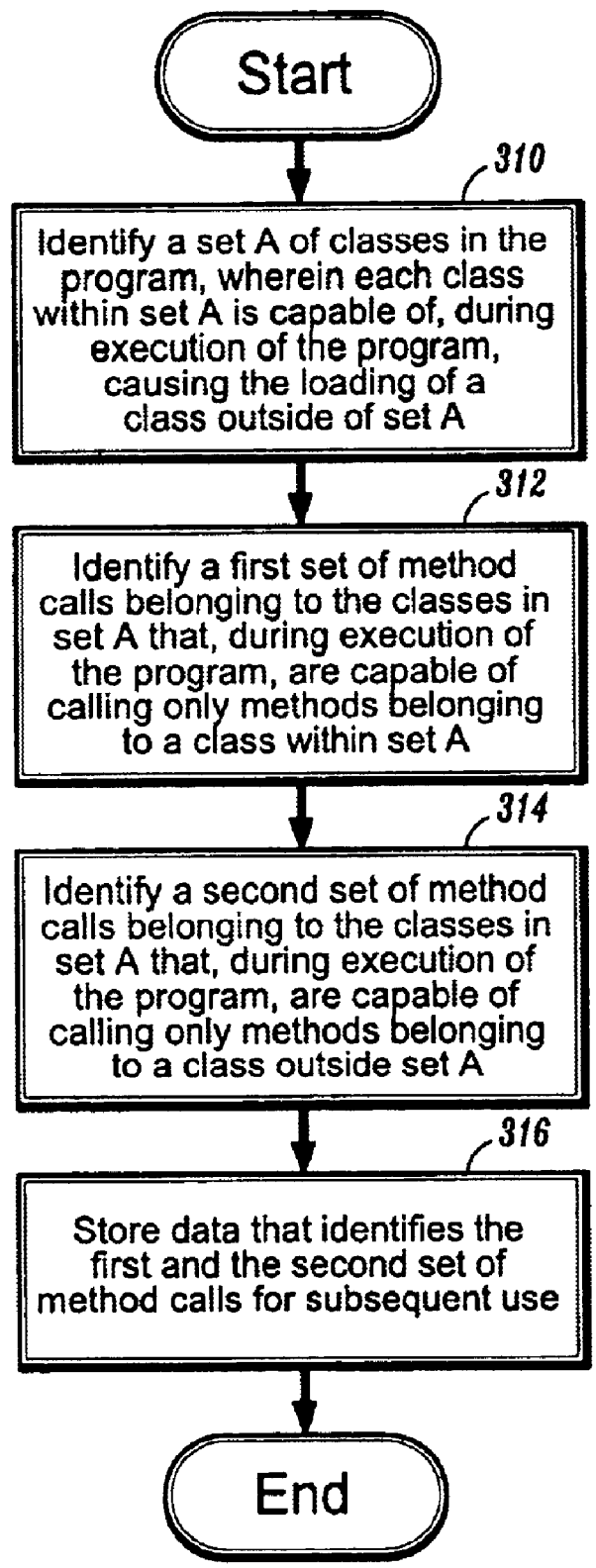
FIG. 3 is a flow diagram of a method for analyzing an object oriented program that supports dynamic class loading, according to an illustrative embodiment of the present invention.

FIG. 3 is a flow diagram of a method for analyzing an object oriented program that supports dynamic class loading, according to an illustrative embodiment of the present invention. The method of FIG. 3 corresponds to step 210 of FIG. 2.

A set A of classes in the program is identified, wherein each class within set A is capable of, during execution of the program, causing the loading of a class outside of set A (step 310). A first set of method calls belonging to the classes in set A are identified that, during execution of the program, are capable of calling only methods belonging to a class within set A (step 312). A second set of method calls belonging to the classes in set A are identified that, during execution of the program, are capable of calling methods belonging to a class outside set A (step 314). Data that identifies the first and the second set of method calls is stored for subsequent use (step 316).

Figure 4:
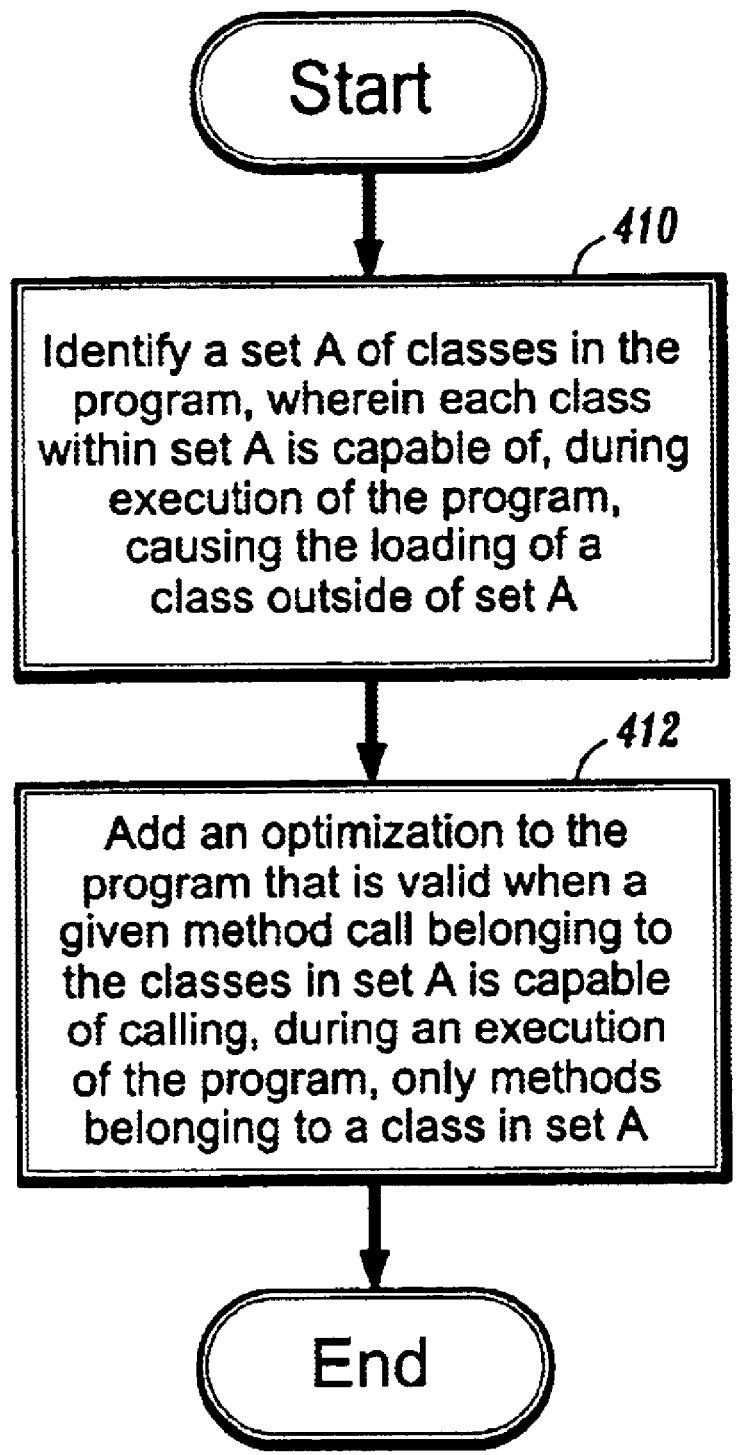
FIG. 4 is a flow diagram of a method for optimizing an object oriented program that supports dynamic class loading, according to an illustrative embodiment of the present invention.

FIG. 4 is a flow diagram of a method for optimizing an object oriented program that supports dynamic class loading, according to an illustrative embodiment of the present invention. The method of FIG. 4 corresponds to steps 312 and 314 of FIG. 3.

A set A of classes in the program is identified, wherein each class within set A is capable of, during execution of the program, causing the loading of a class outside of set A (step 410). An optimization is added to the program that is valid when a given method call belonging to the classes in set A is capable of calling, during an execution of the program, only methods belonging to a class in set A (step 420).

Figure 5:
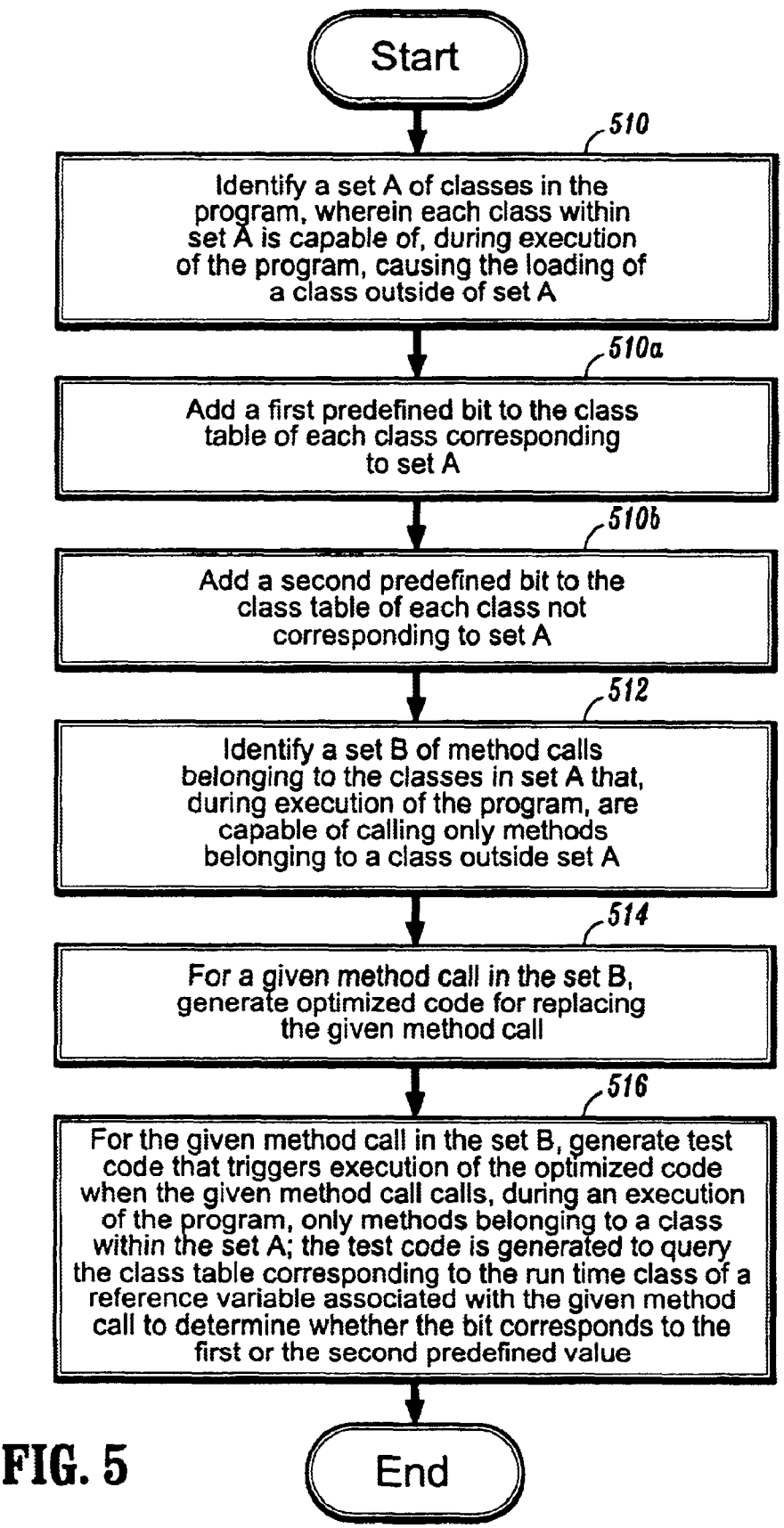
FIG. 5 is a flow diagram of a method for analyzing and optimizing an object oriented program that supports dynamic class loading, according to another illustrative embodiment of the invention.

FIG. 5 is a flow diagram of a method for analyzing and optimizing an object oriented program that supports dynamic class loading, according to another illustrative embodiment of the present invention.

A set A of classes in the program is identified, wherein each of the classes within the set A is capable of, during execution of the program, causing loading of a class outside of the set A (step 510). Step 510 includes the steps 510a and 510b. At step 510a, a first predefined bit is added to the class table for each class belonging to the set A. At step 510b, a second predefined bit is added to the class table for each class not belonging to the set A.

A set B of method calls belonging to the classes in the set A is identified that, during execution of the program, are capable of calling methods belonging to a class outside the set A (step 512). For a given method call in the set B, optimized code is generated for replacing the given method call (step 514). For the given method call in the set B, test code is generated that triggers execution of the optimized code in place of the given method call when the given method call calls, during execution of the program, only methods belong to a class within the set A (step 516). The test code is generated to query a class table corresponding to the runtime class of a reference variable associated with the given method call to determine whether the bit corresponds to the first or the second predefined value.

To facilitate a clear understanding of the present invention, definitions of terminology and notations used herein will now be given. It is to be noted that class inheritance relationships in JAVA can be represented using a Class Inheritance Graph (CIG). The term "type" refers to either a class or an interface, and the term "sub-type" refers to either a sub-class or a sub-interface. Given a declaration of the form T p, T refers to the declared type of the reference variable p. During program execution, the type of the object that p points to can be any class R that is (directly or indirectly) derived from T. The designation "R" refers to the runtime type or concrete type of the object that p is pointing to. Now let p be a reference (to an object) and p.foo( ) be a method call. The reference p in p.foo( ) refers to the receiver expression, and the type of the receiver expression is the type of p.

A description of the framework of the present invention will now be given with respect to Table 1, which corresponds to a sample program in the JAVA programming language. The notation C:m is used to indicate that the method m is defined in class C. Classes A, B, and C are the only classes available for off-line analysis. Classes known to the offline analysis are referred to herein as "extant". With respect to the "closed-world" program of the extant classes, "extant analysis" determines that the possible runtime types of the receiver expressions b(cs1) and c(cs2) are among the extant classes. foo(C c) is specialized with respect to this closed-world assumption that the runtime types of b and c are among the extant classes. The specialized version of foo(C c) is designated as foo'(C c). A data flow analysis with respect to the closed-world program determines that the method invocations b.Bbar( ) at cs1 and c.Bbar( ) at cs2 both have only one target, B::Bbar( ). Notice that the class of the object pointed to by b at cs1 is guaranteed to be within the closed-world. On the other hand, the class of the object pointed to by c at cs2 can be either within or outside the closed world. Within foo'(C c), both call sites can be devirtualized and inlined. In contrast, whereas b.Bbar( ) at cs1 can be directly inlined, a runtime test is needed to guard the inlined c.Bbar( ).

TABLE 1

```
Class A {
    public static void foo(C c)
    {                                      Class B {
        ...
        B b = goo( ) ; // b1                  public void Bbar( )
        b.Bbar( ) ; //cs1                     {
        c.Bbar( ) ; //cs2                         ...
    }                                         }
    static B goo( ) {return new B( ) }
                                           class C extends B {
    public void bar (C cl)
    {                                      }
        foo(c1); // cs3
    }
}
```

Since c1 at cs3 and c at cs2 point to the same object, a runtime "extant safety test" can be placed prior to cs3. At runtime, this test determines whether the runtime types of c1 are extant. If so, the specialized foo' (C c) is invoked; if not, the original (unspecialized) foo (C c) is invoked. The transformed code at A::bar( ) is as follows:

```
{
    if (c1 points to an extant object)
        foo' (C c) ;
    else
        foo(C c) ;
}
```

The concept of preexistence in the context of a dynamic compiler was introduced by Agesen et al., in "Inlining of Virtual Methods", 13th European Conference on Object-Oriented Programming, pp. 258–78, June 1999. Here, inlining only takes place for those call sites for which the object pointed to by the receiver expression has already been allocated at the moment of invocation of the containing method. Using their preexistence technique, the method invocation at cs1 cannot be inlined, because the object pointed to by b is not allocated until after the invocation of foo.

Another approach to devirtualization and inlining is based on a runtime type check of the receiver expression as described by Holzle et al., in "Optimizing Dynamically-Dispatched Calls with Run-Time Type Feedback", SIGPLAN '94 Conference on Programming Language Design and Implementation, SIGPLAN Notices, 29(6), pp. 326–36, June 1994. Using this technique, one can devirtualize and inline c.Bbar(b) at cs2 as follows:

```
if (c instance of B || c instance of C) {
    // devirtualize and inline B::Bbar( )
}
else
{
    c.Bbar( ) ;
}
```

In contrast to the runtime type check, the extant safety test of the present invention can cover the entire specialized method. This offers the opportunity for optimizations across the multiple statements of the specialized method. Further, the statements covered by a single extant test can cross method or class boundaries, in which case interprocedural optimizations can be performed across multiple levels of method invocations. Finally, we do not test on object instances but rather on whether an object is extant or not.

A description will be now given of the relationship between JAVA dynamic class loading and the off-line analysis and optimization framework used herein. In JAVA there are several ways in which a new class can be loaded. According to the JAVA specification, a new class should be loaded during execution if there is a reference to an element (such as a field or method) of the new class. This is further described by: Gosling et al., "The JAVA Language Specification", Addison Wesley, 1996; and. Lindholm et al., "The JAVA Virtual Machine Specification", The JAVA Series, Addison-Wesley, 1996. Two other ways of loading a new class in JAVA include: (1) via Class for Name( ) constructs; and (2) via user defined class loaders. The latter is further described by Bracha et al., in "Dynamic Class Loading in the JAVA Virtual Machine", ACM Conference on Object-Oriented Programming Systems, Languages, and Applications, October 1998.

When JAVA is implemented in a static environment, such as the JAVA Application eXtractor (JAX), IBM HPCJ or Marmot, the static compiler expects the whole program to be present during the analysis. This is further describer by: Laffra et al., in "Practical Experience with an Application Extractor for JAVA", ACM Conference on Object-Oriented Programming Systems, Languages, and Applications, November 1999; Fitzgerald et al., and in "Marmot: An optimizing Compiler for JAVA", Technical Report MSR-TR-99-33, Microsoft Research, June 1999.

As an example, JAX searches all methods and classes that are reachable from the main( ) method in the main application class. When JAX encounters a Class.for Name( ) or user defined class loaders, JAX relies on the user to provide all possible classes that can be loaded at such points. If a user fails to provide all classes that can be dynamically loaded at such points, then JAX would potentially generate incorrect code.

In the framework of the present invention, the user is relied upon to provide methods and classes that can participate in the off-line analysis and optimization phase. However, unlike a static JAVA environment, the framework of the present invention guarantees correctness even if the user does not provide all of the dynamically loadable classes. The set of classes and methods that participate in off-line analysis and optimization are referred to herein as the "closed-world program". Several ways to collect the closed-world program include: (1) use the same strategy as that of a static JAVA compiler (e.g., JAX), except that the user need not specify all possible classes that can be loaded at Class.for Name( ) points or by user-defined class loaders; (2) use profiling information and analyze only "hot" methods and classes; (3) the user can specify the set of all classes and methods that participate in the closed world. Since optimization is performed off-line, one can incur the higher off-line compilation time for better runtime speedup if more hot methods can be specialized using the present invention.

A description will now be given of extant analysis according to an illustrative embodiment of the present invention. Since the terms "class" and "type" are used interchangeably herein, it is sometimes said that a "type is extant" instead of a "class is extant." It is to be noted that in JAVA, an object is a runtime instance of a class.

Further definitions will now be given of the terminology and notations corresponding to extant analysis. The phrase "closed-world set" is defined as follows: the set of classes and methods that participate in off-line analysis and optimization. The Closed-World set is denoted by "CW".

A class C (or a method M) is extant if C (or M) is in CW. A class C (or a method M) is non-extant if it is not in CW.

An object O is extant if its runtime type is extant. An object O is non-extant if its runtime type is non-extant.

A reference is extant at a program point if it cannot point to a non-extant object at that program point. A reference is non-extant at a program point if it can point to a non-extant object at that program point.

A virtual call site (or a non-static call site) is non-extant if the receiver expression at that call site is non-extant. A static call site is non-extant if the target method of the call site is not in CW.

Some statements that can affect extant analysis are as follows:

(a) p=new$_e$T( ). An allocation site that creates only extant objects.

(b) p=new$_{ne}$T( ). An allocation site that can potentially create nonextant objects.

(c) p=q. A copy instruction.

(d) p.f=q. A field update instruction (putfield).

(e) p=q.f. A field access instruction (getfield).

(f) p=call$_e$( . . . .). A call site that invokes only extant methods.

(g) p=call$_{ne}$( . . . ) A call site that can potentially invoke non-extant methods. Here p and any of the reference parameters of the function call can potentially point to non-extant objects.

Given the teachings of the present invention provided herein, one of ordinary skill in the related art will contemplate these and other statements that can affect extant analysis.

Extant analysis is a data flow problem for computing at each program point whether a reference variable is extant or non-extant. Extant analysis is performed during the off-line analysis phase.

Figure 6:
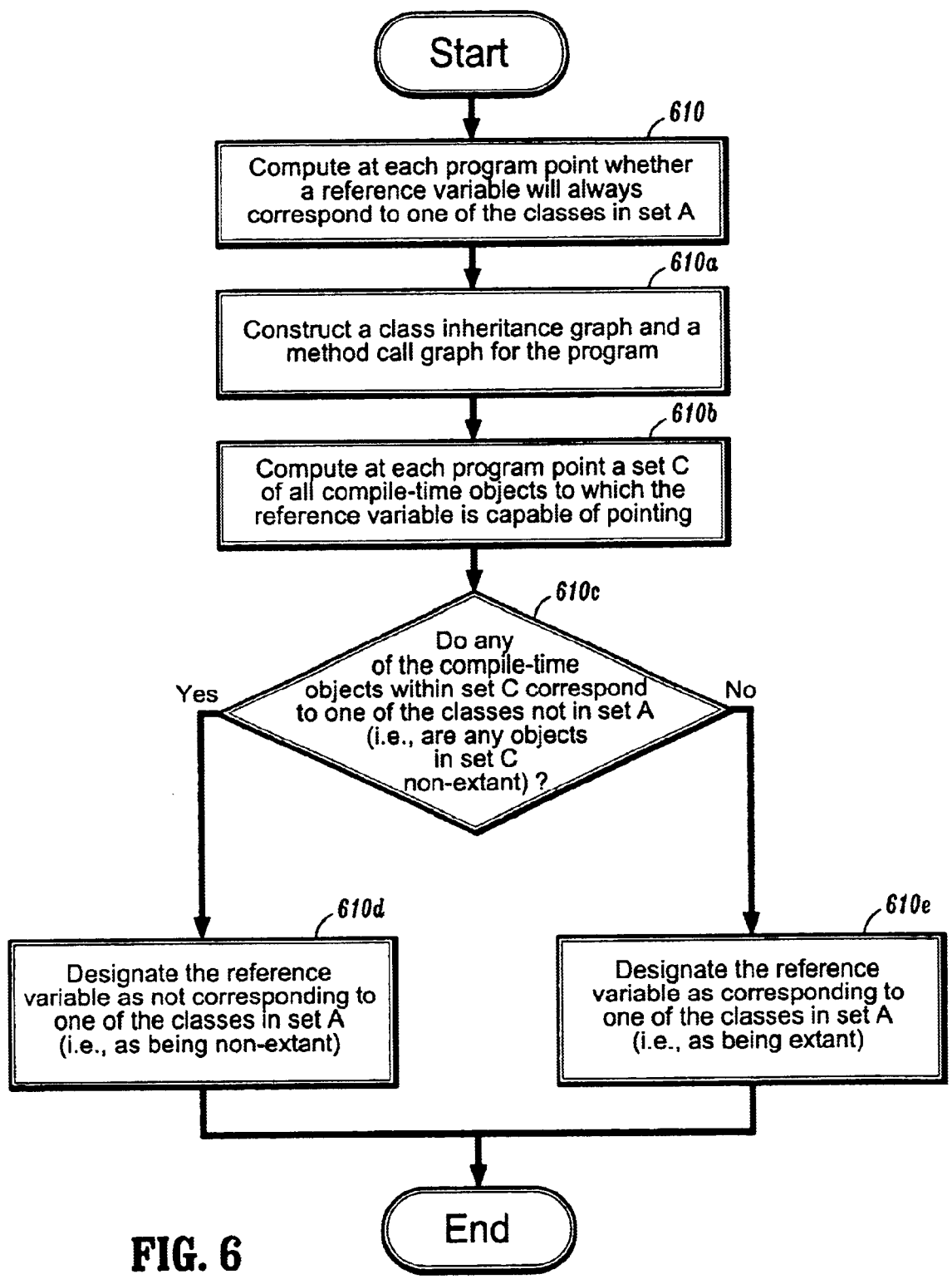
FIG. 6 is a flow diagram of a method for performing extant analysis of an object oriented program, according to an illustrative embodiment of the present invention.

FIG. 6 is a flow diagram of a method for performing extant analysis of an object oriented program, according to an illustrative embodiment of the present invention.

At each program point, it is computed whether a reference variable will always correspond to one of the classes in set A (step 610). Step 610 includes steps 610a through 610e.

The class inheritance graph and the method call graph for the program are constructed (step 610a). These graphs may be constructed using any of the standard algorithms, such as those described by: Bacon et al., in "Fast Static Analysis of C++ Virtual Function Calls", ACM Conference on Object-Oriented Programming Systems, Languages, and Applications, pp. 324–41, October 1996; and Chambers et al., "Call Graph Construction in Object-Oriented Languages", ACM Conference on Object-Oriented Programming Systems, Languages, and Applications, pp. 108–24, October 1997.

At each program point, a set C of all compile-time objects to which the reference variable is capable of pointing is computed (step 610b). To perform the computation, any of the pointer analysis techniques can be used, such as, for example, those described by: Emami et al., in "Context-Sensitive Interprocedural Points-To Analysis in the Presence of Function Pointers", SIGPLAN '94 Conference on Programming Language Design and Implementation, SIGPLAN Notices, 29(6), pp. 242–56, June 1994; Lam et al., "Efficient Context-Sensitive Pointer Analysis for C Programs", SIGPLAN '95 Conference on Programming Language Design and Implementation, SIGPLAN Notices, 30(6) pp. 1–12, June 1995; Landi et al., in "A Safe Approximate Algorithm for Interprocedural Pointer Aliasing", SIGPLAN '92 Conference on Programming Language Design and Implementation, SIGPLAN Notices 27(6), pp. 235–48, June 1992; Burke et al., in "Efficient Flow-Sensitive Interprocedural Computation of Pointer-Induced Aliases and Side Effects", $20^{th}$ Annual ACM SIGACT-SIGPLAN Symposium on the Principles of Programming Languages, pp. 232–45, January 1993; and Bjarne Steensgaard, "Points-To Analysis in Almost Linear Time", $23^{rd}$ Annual ACM SIGACT-SIGPILAN Symposium on the Principles of Programming Languages, pp. 32–41, January 1996.

A compile-time object is extant if its type is extant. Otherwise, it is non-extant. Compile-time objects are identified using a compile-time naming scheme similar to those used in pointer analysis, such as, for example, the naming scheme described by Chase et al., in "Analysis of Pointers and Structures", SIGPLAN '90 Conference on Programming Language Design and Implementation, SIGPLAN Notices 25(6), pp. 296–310, June 1990.

Given the set of compile-time objects to which a reference variable can point, it is determined whether any of the compile-time objects within set C correspond to one of the classes not in set A (i.e., are any of objects in set C non-extant) (step 610c). If so, the reference variable is designated as not corresponding to one of the classes in set A (i.e., the reference variable is designated as being non-extant) (step 610d). Otherwise, the reference variable is designated as corresponding to one of the classes in set A (i.e, the reference variable is designated as being extant) (step 610e).

Consider the example shown in Table 2, which corresponds to a code fragment in the JAVA programming language. At S1, the reference variable p points to an extant object (assuming that B is extant), whereas at S4, p can potentially point to an non-extant object (assuming that the value of cName is not known during the off-line phase). Therefore at S6, the receiver expression p can invoke a method Bbar( . . . ) that may not be in the closed world.

TABLE 2

```
{
    B p;
    if ( . . . )
S1:     p = new B( ) ;               // extant
    else
    {
S2:     Class c = Class.forName(cName) ;
S3:     Object o = c.NewInstance( ) ;
S4:     p = (B) o;                   // non-extant
    }
S5: for ( . . . )
    {
S6: p.Bbar( . . . ) ;                // p is extant or non-extant
    }
}
```

It is to be appreciated that if a receiver expression p at a call site p.foo( ) is extant, then during execution all possible target methods of the call are within the closed world. An important implication of the immediately preceding property is that we never need a runtime type check with respect to an optimization of such extant call sites. For instance, such call sites can be directly devirtualized and inlined without any runtime type checks guarding the inlined method, if during offline analysis it can be determined that there is only one target for such virtual calls.

If a receiver expression can point to a non-extant object, then the call site can potentially invoke methods outside the closed world. Such call sites are referred to as "exit boundary points" of the closed world. The invocation of p.Bbar( . . . ) at S6 in Table 2 is an example of an exit boundary point. We need a runtime test to guard the invocation of such call sites.

In JAVA, a public method can be invoked from outside the closed world. Let M( . . . ) be a method that can be invoked from outside the closed world. Methods such as M( . . . ) are referred to as "entry boundary points" to the closed world. If p is a reference parameter of M, then p can also potentially point to a non-extant object. When a reference variable is passed as a parameter to a method invocation on a potentially non-extant object, the extant state of the objects indirectly reachable from the parameter can become non-extant because the objects can be replaced. A statement which performs a read of a static reference variable is also an entry boundary point, as such a variable may have been modified by another thread during the execution of the containing method.

Hereinbelow, extant analysis information will be used to compute methods that are candidates for specialization, and to compute the extant safety test for determining whether to call the specialized or unspecialized method during execution.

A description will now be given of how to identify candidate methods for specialization using extant analysis. This will be followed by a description of how to use concepts from parametric data flow analysis to generate specialized methods.

According to the framework of the present invention, a method or a part of a method is always specialized with respect to an exit boundary point in the closed world. Above, extant analysis was used to determine the extant state of a receiver expression. If the extant state of the receiver expression p at a virtual call site p.foo( ) is extant, then unconditional optimization can be performed with respect to such call sites. But if the extant state of p is non-extant we can do one of the following (depending on the "degree of extantness"): (1) do not perform any optimization with respect to such exit boundary points; or (2) perform optimizations with respect to such exit boundary points, but guard the optimized code using a dynamic test.

A description of how to identify code regions that are candidates for optimization will now be given. We optimize code with respect to an exit boundary point only if it is beneficial to do so. A receiver expression that can never point to an extant object is referred to as unconditionally non-extant. We assume that the receiver expression is not unconditionally non-extant.

To motivate the problem, consider the simple example shown in Table 3. Assume that all classes shown in Table 3 belong to the closed world.

TABLE 3

| Class A{ | class B{ |
|---|---|
| public void AbarC cl, String S) | public void Bbar |
| | (B b) |
| { | { |
| S1: Afoo(c1) ; | ... |
| S2: Agoo(cl, s) ; | } |
| } | } |
| private void Afoo(C c) | class C extends B { |
| { | ... |
| S4: B b = new B( ) ; // extant | public void Efoo( ) |
| S5: c.Bbar(b) ; | { |
| } | ... |
| | } |
| private void Agoo(C c, String s) | } |
| { | |
| ... | class D{ |
| S6: if( . . .) { | ... |
| S7: Class x - Class.forName(s) | public void Dbar(A si) |
| S8: Object c=x.newInstance( );//non-extant | { |
| } | S10: C cc = new C( ) ; |
| S9: c.Bbar(b) ; | S11: a1.Abar(cc, |
| | " ... ") ; |
| ... | } |
| } | } |
| } | |

The compile-time object created at S10 and passed to method A::Abar( . . . ) as the first parameter, i.e, c1, has its initial extant state as extant. Since A::Abar( . . . ) is a public method, the extant state of the compile-time object is applied to a meet with non-extant, resulting in the extant state of non-extant. c1 is passed to parameter c of A::Afoo (C c) at S1. The extant state of receiver expression c at S5 does not change in A::Afoo (C c), and we apply specialization to A::Afoo (C c) to create a specialized A::Afoo'(C c) in which we directly devirtualize and inline c.Bbar(b) at S5 (without any runtime guards controlling the inlined method). A::Afoo(C c) is specialized here with respect to the exit boundary point defined at S5. During execution, we perform an Extant Safety Test (EST) at S1 to determine whether to call the specialized version A::Afoo'(C c) or to call the unspecialized version A::Afoo (C c). Once A::Afoo'(C c) is invoked, it can safely execute for that invocation even if a new class is loaded that can override the method B:Bbar(B b).

Now consider the method A::Agoo (C c, String s). We cannot specialize the whole method A::Agoo ( . . . ) wherein we can directly inline c.Bbar(b). In both A::Afoo (C c) and in A::Agoo( . . . ), the receiver expression c for invocations of c.Bbar(b) at S5 and S9, respectively, can point to a non-extant object. But in the case of A::Afoo (C c) the target object of the receiver expression c at S5 cannot change between S1 and S5, whereas in the case of A::Agoo( . . . ) a new class can be loaded at S7, and the receiver expression at S9 can point to the newly loaded class. We can specialize part of A::Agoo( . . . ) by placing an extant safety test just prior to S9 to check whether the receiver expression can point to a non-extant object generated at S8. It is to be noted that the generation and placement of extant safety tests are described below.

Next, two key properties are established to determine which methods (or parts of methods) are candidates for safe specialization. Intuitively, given an exit boundary point $\chi$, we can place an EST just prior to $\chi$. However, we want to move this test as early as possible to create opportunities for other optimizations. The following property, henceforth referred to as Property 1, essentially states how far up can the test be moved from an exit boundary points.

Property 1: Let m be a program point and let $\chi$ be an exit boundary point, and let $P(m,\chi)$ be the set of all program paths from m to $\chi$ in the program. The statements in $P(m,\chi)$ can be safely specialized with respect to $\chi$ if, during execution (1) there does not exist a non-extant (runtime) object One that can reach $\chi$ before reaching m and (2) any object that reaches both m and $\chi$ is extant.

In Property 1, if m is an entry point to a method M, then we can specialize the whole method M with respect to $\chi$. The portions of M that do not lie on a path from m to $\chi$ will not affect the safety of the specialization. Let us dissect Property 1 into three parts: (1) program point m; (2) the set of paths $P(m,\chi)$; and (3) the exit boundary point $\chi$. At compile-time we want to identify m such that $P(m,\chi)$ can be safely optimized and specialized with respect to $\chi$. To invoke the specialized code we want to place an EST $EST_m$ at m that ensures safe invocation of the specialized code. For an invocation of a path P in $P(m,\chi)$ to be safe, we have to ensure that whenever P is executed, the receiver expression $re_x$ at $\chi$ points to an extant object. Let $p_x$ be the receiver expression of $\chi$, and $EST(p_x)$ be an EST performed at $\chi$ that returns true if and only if $p_x$ points to an extant object. Any EST $EST_n$ that we place at a program point m should satisfy the following property, henceforth referred to as Property 2.

Property 2: An EST at program point m, denoted as $EST_n$, is safe with respect to $EST(p_x)$ if $ES_n$ implies EST $(p_x)$, expressed as $EST_n \supseteq EST(p_x)$.

In other words, whenever $EST_m$ is true, $EST(p_x)$ should be true. But if $EST_m$ is false, then $EST(p_x)$ can be either true or false. We call $EST_m$ a "surrogate" of $EST(p_x)$. We say $EST_m$ is stronger than $EST_n$ (or $EST_n$ is weaker than $EST_m$) if $EST_n \supseteq EST_m$, where $EST_m$ and $EST_n$ are two surrogates (possibly at the same program point) of $EST(p_x)$.

Consider the example program in Table 3. The set of objects pointed to by the receiver expression c at S5 is the same as the set of objects pointed to by c at the entry of A::Afcc( ). But this is not true in the case of A::Agoo( ). Therefore A::Agoo( ) cannot be fully specialized. But if we place an EST immediately prior to S9, the part of the program from the EST point to the exit boundary point can be specialized. Below, we show how to compute the EST.

A description will now be given of specialization using parametric data flow analysis. It is to be noted that immediately above, a description was provided on how to specialize methods for a devirtualization optimization. The optimization was based on a closed-world analysis performed with respect to an exit boundary point. A closed-world analysis which is parameterized with respect to exit boundary nodes is an example of a parametric data flow analysis. Parametric data flow is further described by: Landi et al., in "Data Flow Analysis of Program Fragments", Proceedings of the $7^{th}$ Symposium on the Foundations of Software Engineering, September 1999; and Chatterjee et al., in "Relevant Context Inference", $26^{th}$ Annual ACM SIGACT-SIGPLAN Symposium on the Principles of Programming Languages, January 1999. For devirtualization, the candidate method for specialization contains the exit boundary point. There are optimizations, such as stack allocation based on escape analysis, where the method to be specialized does not contain the exit point on which it depends. For such problems, an interprocedural parameteric data flow analysis is needed to generate the specialized methods. Stack allocation based on escape analysis is described further by Choi et al., in "Escape Analysis for JAVA", ACM Conference on Object-Oriented Programming Systems, Languages, and Applications, October 1999.

Parametric data flow analysis is based on the following concept. Let $\langle c, f \rangle$ denote a data flow fact f whose truth value depends on the condition c. Suppose T is a transformation that uses this fact. Then the transformation T is correct only if the condition c is true during the program execution. Once the condition c becomes false, the transformation T is unsafe.

Consider escape analysis for compile-time garbage collection. Let p=new R( ) be an allocation site in a method M that we wish to transform to p=newstack To. This transformation T is safe only if it can be proven that the objects allocated at this site cannot escape M. Let O be the compile-time object name for this site. Using parametric escape analysis, we can compute parameterized escape information $\langle \Xi, o \rangle$, , where $\Xi$ is the set of exit boundary points that could potentially affect the escapement of O. Assume O does not escape M under the condition that none of exit boundary points in $\Xi$ will target a method outside the closed world. Now we can specialize T with respect to all exit boundary points in $\Xi$, and place an extant safety test guarding the specialized transformation. T is specialized only if a placement can be found for the extant safety test that will satisfy Property 2.

A description will now be given of the generation and placement of extant safety tests. Extant Safety Tests (ESTs) are condition-checks that guard the safe execution of a specialized method (or portions of a method). These tests depend on runtime information. There are several ways to perform the EST. Any test that we perform, however, must satisfy Property 2. Consider Table 3. We can place the following EST at S4:

S4: if (EST(c1)) Afoo'(c1)/*specialized*/else Afoo(c1)/* unspecialized */

EST (c1) returns true if c1 points to an extant object, otherwise it returns false. EST(c1) is a surrogate for EST(c) at S2. ESTs that query objects for safety can be implemented by adding a bit in the class table, and setting the bit to 1 for extant classes. For newly loaded classes (that are not in the closed-world) this bit is set to 0. During runtime we can query the class table to check if the object is extant or non-extant.

EST can also be performed on control flow predicates. Consider the following example:

```
boolean cond = bar( );
if (cond)
{
    y = new_c T( );  //create an extant object
    ...              // assume y is still points
                     // to extant object
}
else if( . . . )
    y = new nc S( ); /// create a non-extant object
S20: y.foo( );
```

In the above example, whenever cond is true, y points to an extant object. Therefore, cond can be considered as a surrogate for EST(y) at S20, and the part of program consisting of the "then" portion can be specialized with respect to y.foo( ) at S20.

A description of the use of the sparse evaluation graph (SEG) for the purposes of the invention will now be given. Sparse evaluation graphs are described by Choi et al., in "Automatic Construction of Sparse Data Flow Evaluation Graphs", 18th Annual ACM Symposium on the Principles of Programming Languages, pp. 55–66, January 1991. The SEG is used for determining the extant tests and their placements. The SEG is a generalization of static single assignment (SSA) and can be applied to both forward and backward monotone data flow problems, while offering the same benefits as those of SSA applied to forward def-use based data flow problems. SSA is described by Cytron et al., in "An Efficient Method for Computing Static Single Assignment Form and the Control Dependence Graph", ACM Transactions on Programming Languages and Systems, 13(4):451–490, October 1991. Unlike SSA, where a definition triggers formation of $\phi$-nodes, in the SEG only a statement with a non-identity transfer function for the analysis triggers formation of $\phi$-nodes. For extant analysis, statements that affect the value of a receiver expression have a non-identify transfer function. The SEG has the following useful properties:

(a) Each use of a variable has a single definition point.

(b) $\phi$-nodes are introduced to merge multiple definitions coming from distinct control flow paths. Let S be the set of definition points of a variable. We introduce $\phi$-nodes at the iterated dominance frontier IDF(S).

(c) Give a variable v, let $SEG_d(v)$ denote the definition point of the use of v. $SEG_d(v)$ will dominate the use point of v.

Now, let $\chi$ be an exit boundary point, and v be the receiver expression of $\chi$. The program point $m=SEG_d(V)$ will satisfy Properties 4.1 and 4.2 for the exit boundary point $\chi$. Therefore, all program statements between m and $\chi$ inclusive can be safely specialized with respect to $\chi$.

If the SEG definition point is the entry of a method, we can place the EST at each call site invoking the method instead of at the entry of the method. Placing the EST in a caller can enable further optimizations in the caller with respect to the called method.

Finally, since the runtime type of a compile-time object is determined at compile time in JAVA by the allocation site, we can consider compile-time objects with an identical runtime type as the same compile-time object. This will reduce the number of merge points, and thereby allow the placement of EST earlier in the program.

A description will now be given of optimization of the extant safety tests. Let $PP(m,\chi)$ be the set of program points which occur in one or more of the paths in $P(m,\chi)$. Given two surrogates $EST_m$ and $EST_n$ of $EST(p_x)$, $EST_n$ is preferable to $EST_n$ if $$EST_n \supseteq EST_m \wedge \; pp(n,x) \supseteq pp(m,x)$$

For example, if $SEG_d(v)$ (described above) is a simple copy from a reference variable, such as "v=w;", the extant safety test applied to w at the program point $n=SEG_d(w)$ whose definition of w reaches the use of w at m is preferable to that applied to v at m. This process of identifying a preferable extant test can be repeated until the definition is a merge node (i.e. a $\phi$ node) or the definition is an assignment of a de-reference such as "v=p.fl;". Another instance of a favored EST is one that can cover multiple exit boundary points.

One can perform several optimizations to identify the most preferable among multiple ESTs. Partial Redundancy Elimination (PRE) for eliminating partially redundant ESTs is one example. An EST E is partially redundant if the truth value of an earlier EST $E_2$ implies the true value $E_1$ for certain program paths.

Using profiling information or static analysis, we can also hoist ESTs to infrequently executed program points. For example, a static analysis applied to the example code segment below might identify that all the objects pointed to by p at S100 are extant if the object pointed to by head at S1 is extant. In that case, we can place an extant safety test for the object pointed to by head at S1 that covers all the objects pointed to by p at S100 in the loop body.

```
...
S1:
    for (T p = head ! null; p   p.next)
    {
        ...
        S100: p.m. ( ... );
        ...
    }
```

There exists a tradeoff between the strength (i.e. precision) of an extant safety test and the size of the set of program points that can be specialized. Although $EST_n \supseteq EST_m$, $EST_n$ might be favored over $EST_m$ if $PP(m,\chi) \supseteq PP(n,\chi)$—the increased size of the specialized code, at the cost of the larger failure rate of $EST_n$, might still improve the overall performance of the optimized code. Profiling and static analysis can help determine whether (and where) the precision of an extant safety test can be sacrificed for the increased size of the specialized code.

A description will now be given of experiments and corresponding results. Table 4 illustrates the benchmark programs used in the experiments. All benchmarks are from the SPECjvm98 suite. The following two kinds of experiments were performed: (1) measuring closed-world characteristics; (2) measuring extant analysis characteristics. The Jalapeño Virtual Machine was used as the experimental platform. The Jalapeño Virtual Machine is an implementation of JAVA written in mostly pure JAVA, as described by Alpern et al., in "Implementing Jalapeño in JAVA", ACM Conference on Object-Oriented Programming Systems, Languages, and Applications, October 1999.

TABLE 4

| Program | Description | Class | Meth | CWMeth | CWVMeth |
|---|---|---|---|---|---|
| jess | NASA's CLIPS expert system | 112 | 674 | 770 | 667 |
| db | Database search and modify | 15 | 194 | 273 | 188 |
| JAVAc | Source to byte code compiler | 71 | 741 | 862 | 756 |
| mpegaudio | Decompress audio file | 55 | 433 | 495 | 396 |
| mtrt | Multithreaded image rendering | 38 | 339 | 415 | 321 |
| jack | Parser generator generating itself | 59 | 458 | 547 | 456 |

Closed-world characteristics will now be described with respect to the implementation and test results of the invention. We used the profile-based approach to collect the closed world. The Jalapeño Virtual Machine was instrumented to collect method profile information (i.e., the number of times a method is executed) and the set of methods and classes that should be included in the closed world. A data size of 1 was used, as defined by SPECjvm98, during the profiling and the closed-world collection phase. Methods that were executed at least once in the closed world were included in the experiments. The closed world contains both the application methods and the JAVA library methods, but does not include methods from the Jalapeño Virtual Machine.

The term "virtual call" is used herein to refer to a non-static call (e.g., invokevirtual, invokeinterface, or invokespecial). Table 4 illustrates descriptions of the benchmarks used in the experiments. In table 4, the "Class" column indicates the number of classes in the application. The "Meth" column indicates the number of methods in the application. The "CWMeth" column indicates the number of methods in the closed world, including JAVA library methods used. Finally, "CWVMeth" column shows the number of virtual methods in the closed world.

Dynamic characteristics of the closed world were analyzed. The Jalapeño Virtual Machine was again instrumented to collect the dynamic information. However, this time, during the analysis phase a data size of 10 was used, as defined by the SPECjvm98. Table 5 below illustrates the closed-world characteristics. That is, Table 5 shows the dynamic results that were collected. The "Calls" column shows the total number of method calls. The "VC" column shows the total number of virtual calls. The "CWCW" column shows the dynamic number of calls in which both the callee and the caller were in the closed world. The "CWOW" column shows the number of calls in which the callee was in the closed world and the caller was not in the closed world. The "OWCW" column shows the number of calls in which the callee was not in the closed world and the caller was in the closed world. The "appCWCW" column shows the number of calls in which both the caller and the callee are within the application.

The column "% CWCW" shows that on average 93.4% of the time the caller and the callee are with the closed world. This shows that one can do optimistic interprocedural optimization assuming the closed world is the whole program, and 93.4% of the time the outside world will not pollute the closed world. The last column in Table 5, the "% appCWCW" column, shows the percentage of calls that are within the application. The percentage here varies from 3.7% to 98.2%. The benchmarks db and jack make a large number of calls to JAVA library methods. By ignoring libraries for such programs, the closed world is not an effective basis for interprocedural optimization.

TABLE 5

| Program | Calls | VC | CWCW | CWOW | OWCW | appCWCW | % CW CW | % app CWCW |
|---|---|---|---|---|---|---|---|---|
| jess | 6041190 | 5910871 | 5781026 | 214756 | 7786 | 5292904 | 95.6 | 91.6 |
| db | 2255025 | 1784217 | 2191538 | 47556 | 19 | 81112 | 97.2 | 3.7 |
| JAVAc | 3088540 | 3015046 | 2786592 | 187043 | 28841 | 1313394 | 90.2 | 47.1 |
| mpegaudio | 11510851 | 9289136 | 9417510 | 2061142 | 16505 | 9245643 | 81.8 | 98.2 |
| mtrt | 23122500 | 2276693 | 22698824 | 407974 | 23 | 20882723 | 98.2 | 91.2 |
| jack | 6333592 | 5775934 | 6177408 | 139957 | 27 | 867514 | 97.5 | 14.2 |

A description will now be given of extant analysis and devirtualization with respect to the implementation and test results of the invention. To study the extant analysis framework, we implemented a Steensgaard-style flow-insensitive/context-insensitive analysis to compute extant information. Such an analysis is described by Bjarne Steensgaard, "Points-To Analysis in Almost Linear Time", 23$^{rd}$ Annual ACM SIGACT-SIGPLAN Symposium on the Principles of Programming Languages, pp. 32–41, January 1996. Tables 6, 7, and 8 show the results of our experiment. The closed-world program collected during the profiling phase was used for our analysis. This time we included all the methods of the application suite, and included only those library methods that were executed at least 20 times (during the profiling phase). We used the method profile information to annotate the call graph for obtaining dynamic counts of the result. In all the tables, the prefix "Dyn" indicates a weighted dynamic count of the static information. The results provided herein optimistically assume that the public methods are not called from outside the closed world.

TABLE 6

| Program | VC | ExVC | % ExVC |
|---|---|---|---|
| jess | 3480 | 1256 | 36.1 |
| db | 1036 | 282 | 27.2 |
| JAVAc | 5273 | 1256 | 23.8 |
| mpegaudio | 1520 | 472 | 31.1 |
| mtrt | 1975 | 627 | 31.7 |
| jack | 2784 | 619 | 22.2 |

Table 6 illustrates virtual call characteristics. In Table 6, column "VC" shows the number of virtual calls, and column "ExVC" shows the number of virtual calls that are extant. Recall the extant calls are calls that are guaranteed by the extant analysis to be within the closed world. Optimizations that depend on such calls never need to be guarded by an extant safety test. From Table 6 it can be seen that, on average, 28.7% of the virtual calls are within the closed world. Column % ExVC shows the percentage of virtual calls which are extant.

Table 7 illustrates the characteristics of devirtualization. A simple class hierarchy-based algorithm was implemented for determining whether a virtual call can be devirtualized (and possibly inlined). The column "VC" shows the number of virtual calls. The column "DeV" shows the number of virtual calls that can be devirtualized when assuming that the closed world is the whole program. The corresponding number of dynamic virtual calls and the dynamic number of such virtual calls that can be devirtualized are given in columns "DynVC" and "DynDeV", respectively. From column "% DeV" it can be seen that on average 95.4% of the virtual calls can be devirtualized assuming that the closed world is the whole program. The corresponding dynamic percentages are shown in column "% DynDeV". The corresponding dynamic average is 75.3%.

The column "ExDeV" shows the number of extant calls that can be devirtualized. The column "% ExDeV" shows the percentage of the devirtualized calls that are guaranteed to be within the closed world. These calls can be directly devirtualized and inlined (i.e., these calls do not require extant safety tests to guard them). On average, 29.3% of the calls can be devirtualized without a need for extant safety tests to guard them. The corresponding dynamic measure (columns "DynExDev" and "% DynExDev") shows that on average 32.3% of the dynamic calls do not require any guards.

The next set of measurements is related to whole method specialization for devirtualization. Table 8 below shows how much specialization can be done for devirtualization. For such whole method specialization, the extant safety test is

TABLE 7

| Program | VC | DeV | % DeV | DynVC | DynDeV | % DynDeV | ExDeV | % ExDeV | DynExDeV | % DynExDeV |
|---|---|---|---|---|---|---|---|---|---|---|
| jess | 3480 | 3431 | 98.5 | 475113 | 385206 | 81.1 | 1244 | 36.2 | 125526 | 32.5 |
| db | 1036 | 1008 | 97.3 | 81721 | 52573 | 64.3 | 280 | 27.8 | 5165 | 9.8 |
| JAVAc | 5273 | 4948 | 93.8 | 233125 | 111199 | 47.7 | 1124 | 22.7 | 17614 | 15.8 |
| mpegaudio | 1520 | 1487 | 97.8 | 1115287 | 1039842 | 93.2 | 470 | 31.6 | 704540 | 67.7 |
| mtrt | 1975 | 1949 | 98.7 | 5246319 | 4885561 | 93.1 | 626 | 32.1 | 1722842 | 35.2 |
| jack | 2784 | 2417 | 86.8 | 2897827 | 2192136 | 75.6 | 618 | 25.6 | 720839 | 32.9 | outside the method being specialized. The column "CWVMeth" gives the number of virtual methods in the closed world. The column "SpDeV" shows the number of such methods that can be specialized for devirtualization with respect to at least one exit boundary point. For these exit points, the non-extant objects pointed to by the corresponding receiver expression are all created prior to invoking the method that is a candidate for specialization. We find, on average, 81.5% of the methods are candidates for such specialization. The corresponding dynamic measure is 44.5%.

TABLE 8

| Program | CWVMeth | SpDeV | % SpDev | DynMeth | DynSpDeV | % DynSpDeV |
|---|---|---|---|---|---|---|
| jess | 667 | 517 | 77.5 | 475113 | 233026 | 49 |
| db | 188 | 168 | 89.3 | 81721 | 40046 | 49 |
| JAVAc | 756 | 541 | 71.5 | 233125 | 172884 | 74.1 |
| mpegaudio | 396 | 277 | 69.9 | 1115287 | 338423 | 30.3 |
| mtrt | 321 | 219 | 68.2 | 5246319 | 676308 | 12.9 |
| jack | 456 | 392 | 85.9 | 2897827 | 1503313 | 51.9 |

A description will now be given of related work with respect to the present invention. Specialization is a technique for instantiating a program with respect to some runtime invariants. Specialization is described by: Chambers et al., in "Selective Specialization for Object-Oriented Languages", SIGPLAN '95 Conference on Programming Language Design and Implementation, SIGPLAN Notices, 30(6), pp. 93–102, June 1995; and Consel et al., in "A general Approach for Run-Time Specialization and its Application to C", 1996 ACM Symposium on Principles of Programming Languages, pp. 145–56, January 1996. Specialization has been investigated and applied for variety of languages. We apply specialization in the context of a dynamic class loading for JAVA programs. We use extant analysis to determine the runtime invariants which we use to specialize methods and partial methods. One disadvantage of specialization is that it can increase code size; thus, specialization should be applied only to "shot methods", as described in the preceding article by Consel et al.

Extant tests offer better optimization opportunities than tests based on the runtime type of an object that typically guard against incorrect specialization for a receiver expression. One such runtime test is described by Holzle et al., in "Optimizing Dynamically-Dispatched Calls with Run-Time Type Feedback", SIGPLAN '94 Conference on Programming Language Design and Implementation, SIGPLAN Notices, 29(6), pp. 326–36, June 1994. In contrast to such runtime tests, a single extant test can cover multiple statements, and thereby offers the opportunity for optimizations across the multiple statements. Further, the multiple statements covered by a single extant test can cross methods or class boundaries, in which case interprocedural optimizations such as inlining can be performed across multiple levels of method invocations.

The concept of preexistence in the context of a dynamic compiler was introduced by Detlefs and Agersen so that inlining only takes place for those call sites for which it can be proved that the object pointed to by the receiver expression has been allocated. Detlefs and Agersen describe the concept of pre-existence in "Inlining of Virtual Methods", 13th European Conference on Object-Oriented Programming, pp. 258–78, June 1999. Their preexistence analysis is related to our intraprocedural extant analysis. One problem with Detlefs and Agsen's scheme is that the inlining transformation in a method m may have to be invalidated and the method m may have to be recompiled for some future invocation of m. For instance, if p.n is a method that is inlined in m, and if in the future we pass an object to p which calls a different method than what was inlined, we have to invalidate m.

Our framework is more general than preexistence and runtime type checking in that it can be applied to optimizations other than inlining, such as escape analysis.

A dynamic compiler, such as Detlefs and Agesen's, has an advantage over a static compiler in that dynamic compiler performs, during execution, (potentially) multiple compilation phases during which a few methods/classes are compiled or inlined. An object or class non-extant to a dynamic compilation phase can become extant to a subsequent dynamic compilation phase, which can optimize code referring to the newly extant object or class. A static compiler usually has one compilation phase, before execution of the program: a non-extant class/object remains non-extant throughout execution. This limitation of a static compiler can be overcome by aggressively analyzing and optimizing a newly loaded class in an incremental fashion during execution of the code.

Our formulation of parametric data flow analysis is related to other work. Burke and Torczon formulate a recompilation test that compares current interprocedural information with annotation sets that record those interprocedural facts which must continue to hold for a previous compilation to remain valid. Their test is described in "Interprocedural Optimization: Eliminating Unnecessary Recompilation", ACM Transactions on Programming Languages and Systems, 15(3):367–399, July 1993. Their most precise computation of annotation sets involve augmenting data flow analysis to compute auxiliary information which is associated with the elements of a data flow solution. Parameterized points-to analysis for compiling large programs with multiple modules is described by Chatterjee et al., in "Relevant Context Inference", 26th Annual ACM SIGACT-SIGPLAN Symposium on the Principles of Programming Languages, January 1999. They obtain summary functions for points-to analysis of methods by inference of the relevant conditions on the unknown initial values for parameters and globals at method entry. A framework for analyzing program fragments that is an extension of Chatterjee et al.'s work is described by Landi et al., in "Data Flow Analysis of Program Fragments", Proceedings of the 7th Symposium on the Foundations of Software Engineering, September 1999.

Static JAVA compilers which perform interprocedural analysis and optimization, such as HPCJ and Marmot, do not allow dynamic class loading during program execution. JAX is a byte convertor for compressing application class files. It performs whole program analysis, but again makes a "closed-world" assumption. HOTSPOT and other JIT compilers do not support aggressive interprocedural optimizations. HPCJ is implemented by the IBM High Performance Compiler for JAVA. Marmot is described by Fitzgerald et al., in "Marmot: An optimizing Compiler for JAVA", Technical Report MSR-TR-99-33, Microsoft Research, June 1999. JAX is described by Laffra et al., in "Practical Experience with an Application Extractor for JAVA", ACM Conference on Object-Oriented Programming Systems, Languages, and Applications, November 1999. HOTSPOT and other JIT compilers are described by: Steve Meloan, "The JAVA HOTSPOT Performance Engine: An In-Depth Look", Technical Report, Sun Microsystems, Inc., April 1999; and Ishizaki et al., in "Design, Implementation, and Evaluation of Optimizations in a Just-In-Time Compiler", ACM 1999 JAVA Grande Conference, pp. 119–28, June 1999.

It is to be appreciated that the present invention solves an important problem for efficient execution of JAVA, that of interprocedural optimization in the presence of dynamic class loading. The present invention provides a framework for interprocedural optimization that does not depend upon runtime invalidation and recompilation. The framework is based upon the optimization of a closed-world program prior to execution. A runtime safety test is used to enforce correctness. Experimental results of the framework described herein allow for the expectation that a large percentage of a JAVA program can be optimized as if JAVA does not have the capability for dynamic class loading.

The framework of the present invention was implemented using the Jalapeño Virtual Machine, and a set of SPECjvm98 benchmark programs was experimented on. The Jalapeño Virtual Machine is further described by Alpern et al., in "Implementing Jalapeño in JAVA", ACM Conference on Object-Oriented Programming Systems, Languages, and Applications, October 1999. Using a profiling-guided closed world (described in further detail hereinbelow), it was observed that more than 93% of the method calls are within the closed world. Thus, with the framework described here, we can expect a large percentage of a JAVA program can be optimized as if JAVA does not have the capability for dynamic class loading. Further, based on extant analysis, we measured that on average 28.7% of the virtual calls are guaranteed to be within the closed world. Our measurements also show that on average 95.4% of the virtual calls can be devirtualized if the closed world is not extended during runtime. Also, 29.3% of the devirtualized call sites do not need to be guarded with a runtime test.

Some of the benefits of the present invention will now be described. It is to be appreciated that the invention advantageously provides a framework for interprocedural optimization that does not require invalidation during execution when a new class is loaded. Moreover, an analysis technique, called extant analysis, is provided to identify methods that can be specialized and to identify points in the program that can be affected by dynamic class loading. Parametric data flow analysis is used to perform optimizations on the specialized version of such methods. The invention also provides an extant test that can be performed during execution to invoke the specialized methods. Further, safety properties are provided within the framework of the invention, such as how and when a specialized method can be created and invoked. The results of experimentation performed on the framework using Jalapeño Virtual Machine are described; both static and dynamic results are provided to evaluate the framework.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for analyzing an object oriented program that supports dynamic class loading, the program comprising a plurality of objects, each object belonging to at least one class, the method comprising the steps of:

identifying a set A of classes in the program, wherein each of the classes within the set A is capable of, during execution of the program, causing loading of a class outside of the set A;

identifying a first set of method calls belonging to the classes in the set A that, during execution of the program, are capable of calling only methods belonging to a class within the set A;

identifying a second set of method calls belonging to the classes in the set A that, during execution of the program, are capable of calling methods belonging to a class outside the set A; and storing data that identifies the first and the second set of method calls for subsequent use.

2. The method according to claim 1, further comprising the step of reporting the stored data to a user.

3. The method according to claim 1, further comprising the step of optimizing the program, based upon the stored data.

4. The method according to claim 3, further comprising the steps of:

for a given method call in the second set, adding an optimization to the program that is valid when the given method call calls, during execution of the program, only methods belonging to a class in the set A; and adding code to the program that triggers execution of the optimization when the given method call calls, during execution of the program, only methods belonging to the class in the set A.

5. The method according to claim 1, wherein said steps of identifying the first and the second set comprise the step of performing static analysis of the program.

6. The method according to claim 4, wherein said step of identifying the set A comprises the step of adding a bit in a class table corresponding to a given class and setting the bit to a first predefined value, when the given class is within the set A.

7. The method according to claim 6, wherein said step of identifying the set A comprises the step of setting the bit to a second predefined value when the given class is newly loaded.

8. The method according to claim 7, wherein the code queries a class table corresponding to a runtime class of a reference variable associated with the given method call to determine whether the bit corresponds to the first or the second predefined value.

9. The method according to claim 1, wherein at least some of the classes in the set A are identified by a user.

10. The method according to claim 4, wherein the optimization corresponds to at least one of devirtualization and stack allocation.

11. The method according to claim 4, wherein the code is added to the given method call to enable optimization with respect to the called methods.

12. A method for optimizing an object oriented program that supports dynamic class loading, the program comprising a plurality of objects, each object belonging to at least one class, the method comprising the steps of:

identifying a set A of classes in the program, wherein each of the classes within the set A is capable of, during execution of the program, causing loading of a class outside of the set A; and adding an optimization to the program that is valid when a given method call belonging to the classes in the set A is capable of calling, during an execution of the program, only methods belonging to a class in the set A.

13. The method according to claim 12, further comprising the step of identifying the given method call based upon static analysis of the program.

14. The method according to claim 12, wherein the optimization corresponds to at least one of devirtualization and stack allocation.

15. A method for optimizing an object oriented program that supports dynamic class loading, the program comprising a plurality of objects, each object belonging to at least one class, the method comprising the steps of:
   identifying a set A of classes in the program, wherein each of the classes within the set A is capable of, during execution of the program, causing loading of a class outside of the set A;
   identifying a set B of method calls belonging to the classes in the set A that, during execution of the program, are capable of calling methods belonging to a class outside the set A;
   for a given method call in the set B,
   generating optimized code for replacing the given method call; and
   generating test code that triggers execution of the optimized code in place of the given method call when the given method call calls, during execution of the program, only methods belong to a class within the set A.

16. The method according to claim 15, wherein said identifying steps are performed during an off-line phase.

17. The method according to claim 15, wherein said step of generating the optimized code further comprises the step of performing parametric data flow analysis on the program.

18. The method according to claim 15, wherein the optimization corresponds to at least one of devirtualization and stack allocation.

19. The method according to claim 15, wherein said steps of identifying the set B comprises the step of computing at each program point whether a reference variable will always correspond to one of the classes in the set A.

20. The method according to claim 19, wherein said computing step comprises the steps of:
   constructing a class inheritance graph and a method call graph for the program;
   computing at each program point a set C of all compile-time objects to which the reference variable is capable of pointing;
   determining whether any of the compile-time objects within the set C correspond to one of the classes not in the set A;
   designating the reference variable as not corresponding to one of the classes in the set A, when a compile-time object within the set C does not correspond to one of the classes in the set A;
   designating the reference variable as always corresponding to one of the classes in the set A, when each of the compile-time objects within the set C corresponds to one of the classes in the set A.

21. The method according to claim 20, wherein said step of identifying the set A comprises the step of adding a bit in a class table corresponding to a given class and setting the bit to a first predefined value, when the given class is within the set A.

22. The method according to claim 21, wherein said step of identifying the set A comprises the step of setting the bit to a second predefined value when the given class is newly loaded.

23. The method according to claim 22, wherein the test code queries a class table corresponding to a runtime class of the reference variable associated with the given method call to determine whether the bit corresponds to the first or the second predefined value.

24. The method according to claim 15, wherein the test code is added to the given method call to enable optimization with respect to the called methods.

25. The method according to claim 20, wherein compile-time objects with an identical runtime type are a same compile-time object.

26. A program storage device readable by machine, tangibly embodying a program of instructions executable by the machine to perform method steps for analyzing an object oriented program that supports dynamic class loading, the program comprising a plurality of objects, each object belonging to at least one class, said method steps comprising:
   identifying a set A of classes in the program, wherein each of the classes within the set A is capable of, during execution of the program, causing loading of a class outside of the set A;
   identifying a first set of method calls belonging to the classes in the set A that, during execution of the program, are capable of calling only methods belonging to a class within the set A;
   identifying a second set of method calls belonging to the classes in the set A that, during execution of the program, are capable of calling methods belonging to a class outside the set A; and
   storing data that identifies the first and the second set of method calls for use.

27. The method according to claim 26 further comprising the step of optimizing the program, based upon the stored data.

28. The method according to claim 26 further comprising the steps of:
   given method call in the second set,
      adding an optimization to the program that is valid when the given method call calls, during execution of the program, only methods belonging to a class in the set A; and
   adding code to the program that triggers execution of the optimization when the given method call calls, during execution of the program, only methods belonging to a class in the set A.

29. A program storage device readable by machine, tangibly embodying a program of instructions executable by the machine to perform method steps for optimizing an object oriented program that supports dynamic class loading, the program comprising a plurality of objects, each object belonging to at least one class, said method steps comprising:
   identifying a set A of classes in the program, wherein each of the classes within the set A is capable of, during execution of the program, causing loading of a class outside of the set A;
   identifying a set B of method calls belonging to the classes in the set A that, during execution the program, are capable of calling methods belonging to a class outside the set A;
   for a given method call in the set B,
      generating optimized code for replacing the given method call; and
      generating test code that triggers execution of the optimized code in place of the given method call when the given method call calls, during execution of the program, only methods belong to a class within the set A.

* * * * *